E. BOMMER.
SPRING HINGE.
APPLICATION FILED APR. 15, 1913. RENEWED JAN. 6, 1915.

1,131,662.

Patented Mar. 16, 1915.

UNITED STATES PATENT OFFICE.

EMIL BOMMER, OF NEW YORK, N. Y.

SPRING-HINGE.

1,131,662.   Specification of Letters Patent.   Patented Mar. 16, 1915.

Application filed April 15, 1913, Serial No. 761,143. Renewed January 6, 1915. Serial No. 868.

*To all whom it may concern:*

Be it known that I, EMIL BOMMER, a citizen of the United States of America, residing in New York, in the borough of Brooklyn, county of Kings, and State of New York, have invented certain new and useful Improvements in Spring-Hinges, of which the following is a specification.

This invention relates to improved means of lubricating spring-hinges. The bearing surfaces at the joints of spring-hinges, and more especially the joints of the larger sizes of spring-hinges which have to carry heavy doors, often produce discordant, disagreeable or disturbing noises owing to the lack of proper means for lubricating the dry or rusty joints and other movable parts of the same. While disconnected means for lubricating some particular joint or part, especially in the larger sizes of spring-hinges, were used heretofore, a comprehensive connected system of lubrication, embodying means for lubricating all the movable parts of the spring-hinge which are subject to friction has not been heretofore devised.

The object of this invention is to supply spring-hinges with means for lubricating the joints and other movable parts, by which not only all the movable parts which are subject to friction are lubricated, but also the waste of lubricating oil is prevented and the same fully used for the proper and effective lubrication of the spring-hinge; and for this purpose the invention consists of means for lubricating spring-hinges of the type, which means will be fully described hereinafter and finally pointed out in the claims.

Figure 1:
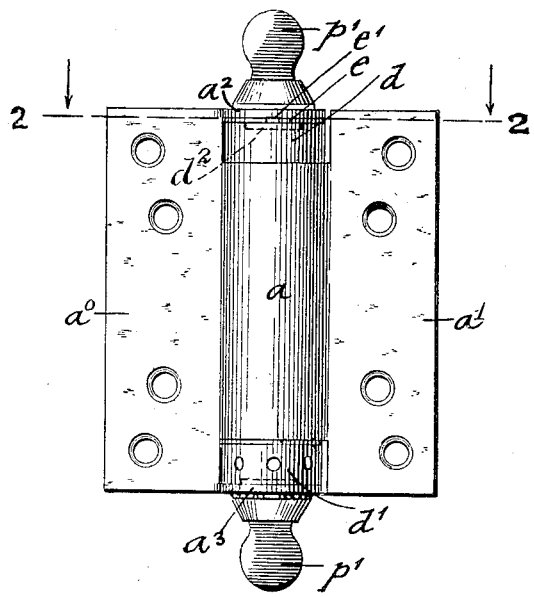
Figure 2:
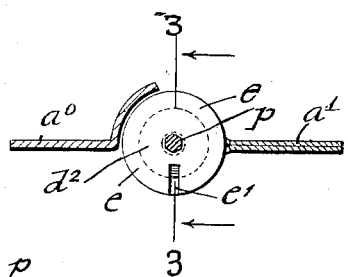
Figure 3:
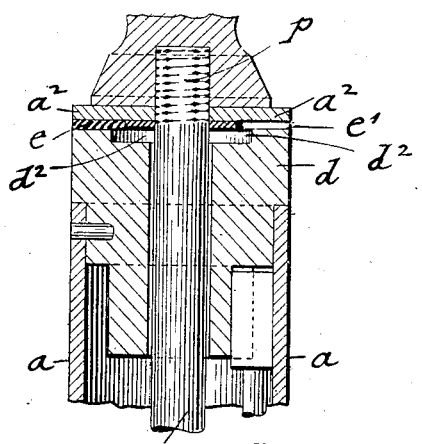
Figure 4:
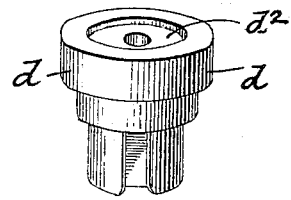
Figure 5:
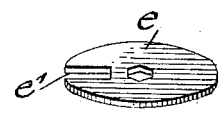

In the accompanying drawings, Figure 1 represents a side-elevation of a single-acting spring-hinge with my improved lubricating means, Fig. 2 is a horizontal section on line 2, 2, Fig. 1, Figs. 3, 4 and 5 are respectively a vertical central section of the fixed spring-holder and washer of the spring-hinge, a perspective view of the fixed spring-holder, and a perspective view of the washer between the same and the bent-up ear of the flange of the spring-hinge.

Similar letters of reference indicate corresponding parts throughout the different figures of the drawings.

Referring to the drawings, $a$ represents the barrel of a spring-hinge, $a^1$ the barrel-leaf and $a^0$ the flange-leaf of the same, $d^1$ the adjustable spring-holder, and $d$ the fixed spring-holder. The flange-leaf $a^0$ is provided with the usual bent-up ears $a^2$, $a^3$, which are provided with central perforations for the pintle $p$. A washer $e$ is interposed between the ear $a^2$ and the fixed spring-holder $d$, said washer and ear being provided preferably with a non-circular hole, while the perforation of the ear $a^3$ adjacent to the adjustable spring-holder $d^1$ is circular, to conform with the respective ends of the pintle $p$. The ends of the pintle $p$ are preferably screw-threaded and provided with tips or terminals $p^1$. The washer $e$ is provided with a radial slot or channel $e^1$ which extends from the circumference inwardly toward the center of the washer $e$, and which serves for distributing the oil injected into the slot $e^1$ when the fixed spring-holder $d$ is uppermost and the spring-hinge is to be supplied with lubricating oil. The adjacent face of the fixed spring-holder $d$ is provided with a shallow annular depression or recess $d^2$, which is concentric with the pintle $p$, for receiving the surplus of the lubricating oil which is injected through the slot or channel $e^1$, after the bearing between the washer $e$ and fixed spring-holder $d$ is sufficiently lubricated. The slot or channel $e^1$ of the washer $e$ is of sufficient length so as to extend over the annular depression or recess $d^2$ of the fixed spring-holder $d$. The oil is then supplied from the depression or recess $d^2$ of the fixed spring-holder to the central pintle-opening of the same and lubricates the contact-surfaces between the pintle $p$ and the fixed spring-holder $d$, running then along the pintle to the adjustable spring-holder $d^1$, so as to lubricate the contact-surface between the pintle $p$ and the adjustable spring-holder $d^1$.

The construction of the pintle $p$ in relation to the ears $a^2$ and $a^3$ of the leaf $a^0$ and the washer $e$ interposed between the ear $a^2$ of the leaf $a^0$ and the fixed spring-holder $d$ is by preference the same as that shown in my pending application, Ser. No. 700,167, filed May 28, 1912, in which the central opening in the washer adjacent to the fixed spring-holder is made hexagonal or non-circular and non-rotatably retained on the pintle, which is made of corresponding cross-section at the point of passing through said washer and the adjacent ear of the flange-leaf, thereby connecting the pintle, washer and flange-leaf into a united movement. By this noncircular connection of the pintle $p$, flange-leaf $a^0$ and washer $e$, the slot or channel $e^1$ of the washer is always located at the same designated position in relation to the ear of the flange-leaf $a^0$ for permitting the convenient oiling of the hinge at all times at the same position.

The invention as described and shown is applicable to either single or double acting hinges and an embodiment has been shown and changes may be made therein without departing from the spirit of the invention as defined in the claims.

I claim:

1. In a spring-hinge, the combination of a fixed spring-holder, a leaf, a pintle for the spring-holder and leaf, and a washer between the spring-holder and leaf, said washer being provided with a radial slot or channel to lubricate the surface between the washer and fixed spring-holder.

2. In a spring-hinge, the combination of a fixed spring-holder, a leaf, a pintle for the spring-holder and leaf, the spring-holder being provided with a depression or recess around the pintle for holding a lubricant, and means communicating with the depression or channel for supplying the lubricant in order to lubricate the surface of the fixed spring-holder.

3. In a spring-hinge, the combination of a spring-holder, a leaf, a pintle for the spring-holder and leaf, and a washer having a radial slot or channel, said spring-holder having a depression or recess around the pintle and in communication with the radial slot or channel of the washer.

In testimony, that I claim the foregoing as my invention, I have signed my name in presence of two subscribing witnesses.

EMIL BOMMER.

Witnesses:
PAUL GOEPEL,
JOHN MURTAGH.